Figure 1:
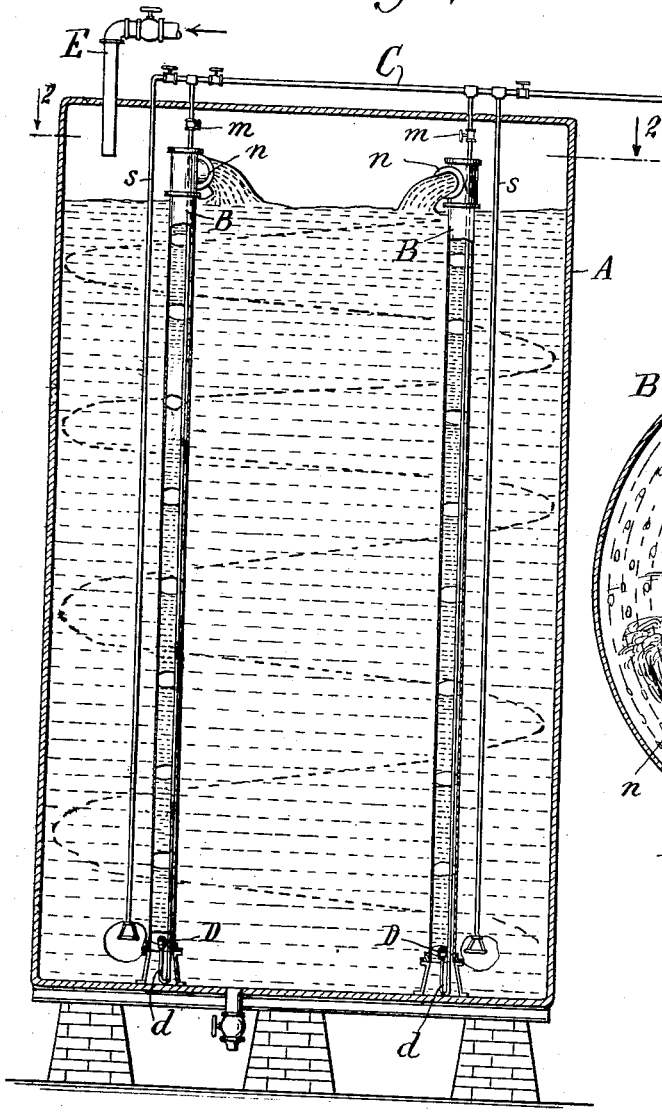

B. MacDONALD.
APPARATUS FOR TREATING ORE PULPS, SLIMES, AND THE LIKE.
APPLICATION FILED JAN. 19, 1912.

1,071,447.

Patented Aug. 26, 1913.

2 SHEETS—SHEET 1.

WITNESSES:
Frank H. Cumcssy
B. G. Colyer.

INVENTOR:
Bernard MacDonald,
BY
Cennie, Davis & Goldsbray
ATTORNEYS.

B. MacDONALD.
APPARATUS FOR TREATING ORE PULPS, SLIMES, AND THE LIKE.
APPLICATION FILED JAN. 19, 1912.

1,071,447.

Patented Aug. 26, 1913.

2 SHEETS—SHEET 2.

WITNESSES:

INVENTOR:
Bernard MacDonald,
BY
ATTORNEYS.

UNITED STATES PATENT OFFICE.

BERNARD MacDONALD, OF GUANAJUATO, MEXICO.

APPARATUS FOR TREATING ORE-PULPS, SLIMES, AND THE LIKE.

1,071,447.     Specification of Letters Patent.     Patented Aug. 26, 1913.

Application filed January 19, 1912. Serial No. 672,081.

*To all whom it may concern:*

Be it known that I, BERNARD MACDONALD, a citizen of the United States of America, and residing at Guanajuato, Mexico, have invented certain new and useful Improvements in Apparatus for Treating Ore-Pulps, Slimes, and the Like; and I do hereby declare the following to be a full, clear, and exact description of the invention, such as will enable others skilled in the art to which it appertains to make and use the same.

My invention relates to certain new and useful improvements designed principally for use in apparatus for the treatment of ore pulp and slimes through the agency of any of the usual solvents appropriate for dissolving out the gold and silver values contained therein; although, as will hereinafter more fully appear from the description and illustration of the apparatus, it is likewise applicable to other analogous purposes.

For the treatment of ores and slimes, by cyanid solutions and the like, I have described and shown in Letters Patent of the United States granted to me under date of February 8, 1910, No. 948,766, an apparatus wherein is provided a receiving tank for the charge to be treated, together with vertical transfer-pipes, open at their lower ends and extending upwardly so as to discharge into the top of the tank, a continuous transfer of the heavier parts of the charge as they settle to the bottom of the tank, being maintained upwardly through the transfer-pipes and back again into the tank by means of air injector jets projecting upwardly and discharging in the direction of the longitudinal centers of the pipes. In accordance with my present invention, and for the purpose of enhancing the efficiency of the apparatus as a whole, in maintaining the solid and solution constituents of the pulp in proper proportionate mixture in the mass, I fit on to the ends of the several transfer-pipes, bends or elbows with the outlets thereof so directed that they will discharge the pulp in the same direction with reference to the sides of the tank. The spouting force of the pulp, discharging from these outlets, on the surface of the tank charge sets up in it a spiral or rotary flow around and around within the tank which retards the settlement of the solids out of the solution with which they are mixed to the benefit of the mixing and agitating action of the apparatus for this purpose.

In the accompanying drawings I have illustrated a form of apparatus embodying my improvements, which form of apparatus I have found effective in practice.

Figure 2:
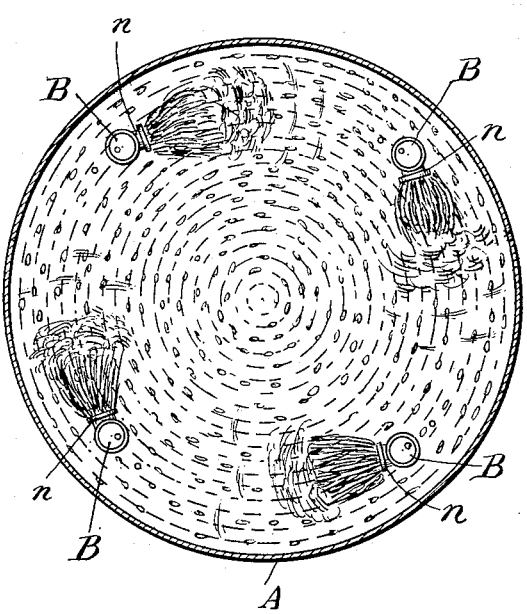
Figure 3:
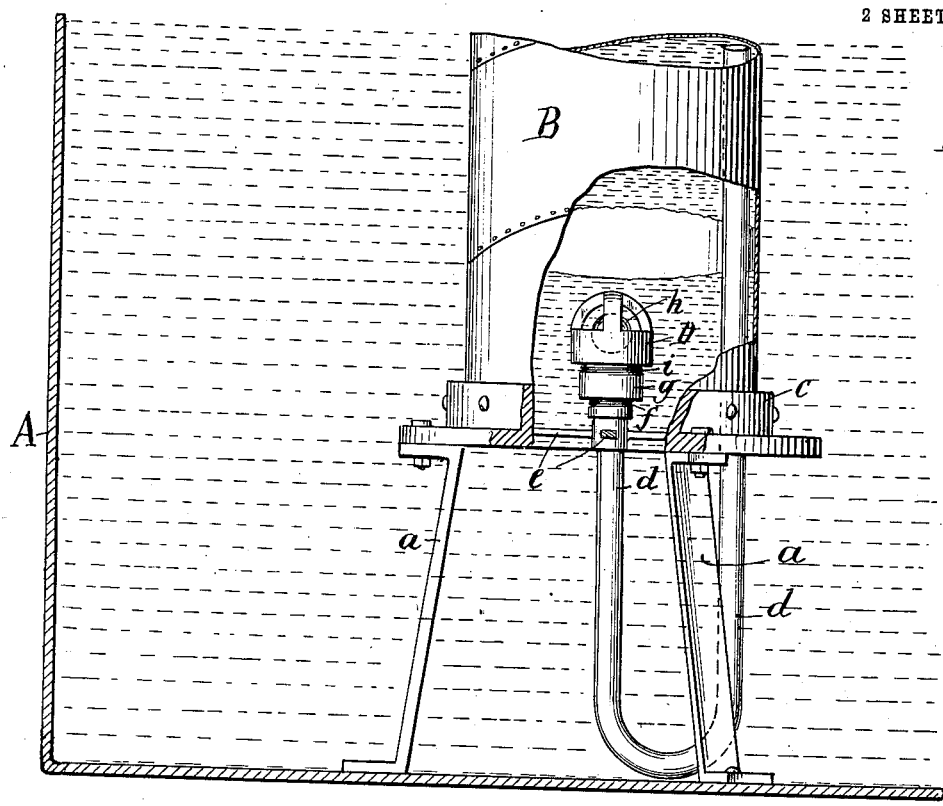
Figure 4:
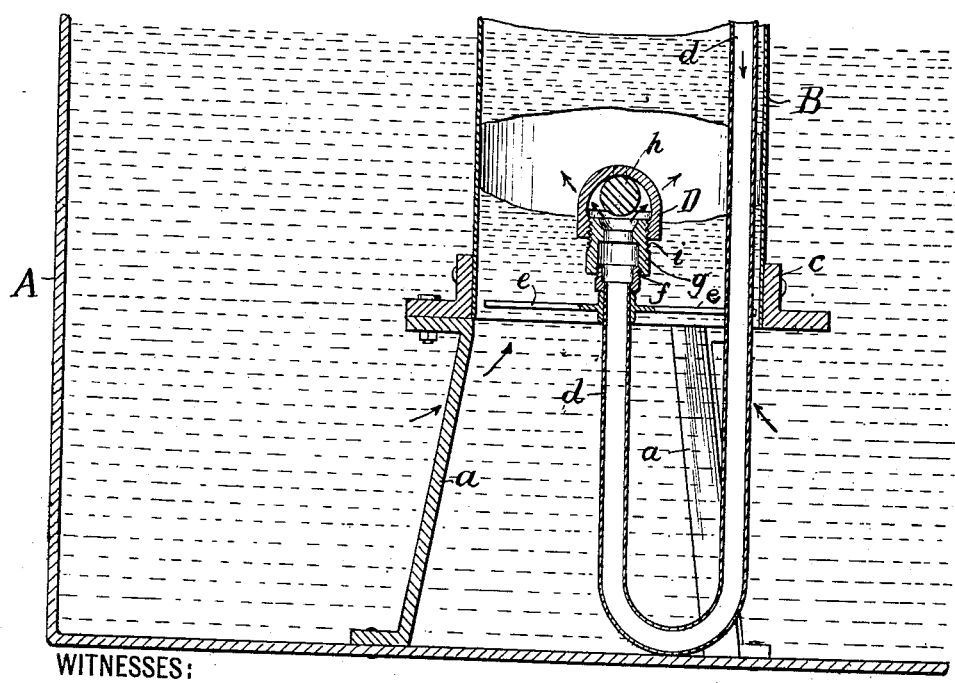

In said drawings—Figure 1 represents a vertical sectional view of the apparatus, taken on a plane extending through two of the transfer-pipes; Fig. 2 represents a top plan view thereof; Figs. 3 and 4 represent, on a larger scale, the lower portion of a transfer-pipe, together with the coöperating nozzle and the compressed-air pipe to which it is attached, and illustrates approximately the characteristic mode or method of operation involved in the practice of the invention.

Similar letters of reference indicate similar parts throughout the several views.

Referring to the drawings, A indicates the receiving tank for the charge to be treated, and B represents the several transfer-pipes. The transfer-pipes may conveniently be supported from the bottom of the tank upon standards or spider leg supports *a* bolted or riveted thereto as shown and which in turn support and are bolted to a flanged bottom ring *c* suitably secured by rivets or the like to the lower portion of the transfer-pipe. Each transfer-pipe is open at its upper end for the passage of a compressed-air pipe *d*, which may conveniently extend from a compressed-air main C, as illustrated in Fig. 1. But the compressed-air pipe may enter the transfer pipes from any other direction. The compressed-air pipe *d* is bent to form an upwardly extending nozzle-carrying portion, and this nozzle-carrying portion is centered within the transfer-pipe in any suitable way, as, for instance, by means of a spider *e* clamped thereto.

The end of the compressed-air pipe *d* is provided with an exterior screw thread *f*, for the convenient attachment of the base piece *g*, constituting a part of the air valve device or air nozzle employed for effecting the upward movement of the material in the transfer-pipes. The base piece may be made of malleable iron, steel, or other suitable material, provided with means for attaching it to the end of the compressed-air pipe, as, for instance, by the interior screw thread shown coöperating with the exterior screw thread *f*. The base piece *g* is likewise provided with a suitable seat for the reception of the ball *h*, of iron, steel, or other suitable material or combination of materials. D is a protecting and regulating hood for the ball $h$, and is attached to the base $g$ in any suitable manner, as, for instance, through the intermediacy of the exterior screw thread $i$ on the base piece $g$ and the corresponding interior screw thread on the hood D. The hood may be made of malleable iron, steel, or other suitable material and being adjustable upon the base piece $g$, it can be set to regulate the limit of upward movement or the play which is necessary to give to the ball to suit the conditions of use in any particular instance. The hood D is provided, as shown, with intersecting and overhanging arches which form a cage for the ball, without interfering substantially with the outward flow of the compressed air during the operation of the device and which serves to lift and transfer the material through the pipe.

In operation, for the purpose for which the apparatus is employed, the tank may be supplied through the inlet pipe E or otherwise with the charge of pulp or slimes of minerals or ores, or other material to be treated and reaches a level immediately below the discharge branches $n$ of the several transfer-pipes B, these discharge ends having the substantially tangential arrangement illustrated in Fig. 2. During the filling or charging operation, the supply of compressed-air to the pipes $d$ is cut off by means of the valves $m$, or the like, and, accordingly, the balls $h$ seat themselves upon the ends of the tubes $d$ and prevent the entrance of the material into said tubes. When the tank is filled to the level described, and when it is desired to begin the operation of elevating, transferring and agitating the material, the valves $m$ are opened appropriately, whereupon the balls $h$ are raised from their seats to the upper limit of their play within the hoods D. Accordingly, the air, as indicated more fully in Fig. 4, escapes into the transfer-pipe in the direction indicated by the arrows in said figure, that is to say, in the form of a sheet which, coming in contact with the inner wall of the transfer-pipe, forms a disk or piston extending across the full diameter of the pipe, as indicated in Fig. 4. The air disk or piston thereupon exerts a lifting force upon the material above it in the transfer-pipe and itself rises in the pipe, drawing after it a quantity of the material to take its place. In the meantime, the ball $h$ again seats itself on the end of the compressed-air pipe, and is almost immediately raised by the compressed-air to the upper limit of its play once more, whereupon a second air disk or piston is formed within the pipe. The formation of the air disks or pistons alternating with intervening portions of the pulp or material to be transferred destroys the hydrostatic equilibrium existing between the part of the material within the transfer-pipe and that part of the material on the outside thereof, and consequently brings about the upward movement or transfer of the thickened pulp which is thus lifted from the bottom of the tank and discharged over the top of the charge. The discharge of the material from the several transfer-pipes in a direction substantially parallel with the walls of the tank has the effect to set up and maintain in the tank charge, from top to bottom of the tank, a rotary helical flow which opposes the settling tendency of the solids or ore particles, sweeps the bottom clear of accumulations of solids in the pulp, bringing them continuously under the open bottom ends of the transfer-pipes, through which they are transferred to the top of the tank, and maintains the solid and solution constituents of the pulp in the proper proportional mixture thereby facilitating the bringing into solution of the metallic particles in the pulp.

The pipes $s$, illustrated in Fig. 1, are provided for the purpose of additionally agitating the charge near the bottom of the tank if required, and especially in the vicinity of the intakes of the transfer-pipes so as to avoid any tendency to accumulation or clogging in their vicinity.

Having thus described my invention, what I claim is:

1. In an apparatus of the kind described, the combination with the container for the material treated, of a transfer pipe provided with an intake at its lower end communicating with the lower part of the container and a discharge opening at its upper end discharging into said container in a direction substantially parallel with the walls thereof, and means for creating an upward movement of the material through said transfer pipe.

2. In an apparatus of the kind described, the combination with a container for the material, of a series of transfer pipes, each provided with an intake at its lower end communicating with the lower portion of the container and a discharge opening at its upper end discharging into said container in a direction substantially parallel to the walls thereof, and means to establish an upward movement of the material through the transfer pipes so as to impart a substantially whirling motion to the material in the container.

3. In an apparatus of the kind described, the combination with the container for the material treated, means for successively withdrawing the material near the bottom of said tank and delivering the same to the upper portion of the tank in a direction substantially parallel to the walls thereof and thereby imparting a substantially helical whirling motion to the entire body of material in the container from the top to the bottom thereof.

4. In an apparatus of the kind described, the combination with the container for the material treated, of a transfer pipe provided with an intake at its lower end communicating with the lower part of the container and a discharge opening at its upper end discharging into said container in a direction substantially parallel to the walls thereof, and means for establishing within the transfer pipe air disks or pistons alternating with intervening portions of the material to be treated, whereby the material is withdrawn from the lower portion of the tank and subsequently discharged into the upper portion thereof.

5. In apparatus of the kind described, the combination with the container for the material treated, of a series of upright transfer-pipes located therein, and means for creating an upward movement of the material through the transfer-pipes, said transfer-pipes being located in proximity to the inner walls of the container and discharging at their upper ends in a direction substantially parallel with the inner walls of the container, so as to impart a substantially whirling motion to the material in the container; substantially as described.

In testimony whereof I affix my signature, in presence of two witnesses.

BERNARD MacDONALD.

Witnesses:
C. E. GUYANT,
N. ARCOS.